United States Patent [19]

Sugitani

[11] Patent Number: 4,843,570
[45] Date of Patent: Jun. 27, 1989

[54] BLOCK PROCESSING APPARATUS

[75] Inventor: Kazunori Sugitani, Tokyo, Japan

[73] Assignee: Cannon Kabushiki Kaisha, Tokyo, Japan

[21] Appl. No.: 816,041

[22] Filed: Dec. 26, 1985

[30] Foreign Application Priority Data

| Dec. 29, 1984 [JP] | Japan | 59-279901 |
|---|---|---|
| Dec. 29, 1984 [JP] | Japan | 59-279902 |
| Dec. 29, 1984 [JP] | Japan | 59-279903 |
| Dec. 29, 1984 [JP] | Japan | 59-279904 |
| Dec. 29, 1984 [JP] | Japan | 59-279905 |
| Dec. 29, 1984 [JP] | Japan | 59-279906 |
| Dec. 29, 1984 [JP] | Japan | 59-279907 |
| Dec. 29, 1984 [JP] | Japan | 59-279908 |
| Dec. 29, 1984 [JP] | Japan | 59-279909 |

[51] Int. Cl.$^4$ .................. G03B 15/00; G06F 3/00
[52] U.S. Cl. .................. 364/518; 340/798; 364/519
[58] Field of Search ................. 364/518-522; 340/750, 798-802; 382/45-47, 49, 53, 54

[56] References Cited

U.S. PATENT DOCUMENTS

| 4,330,834 | 5/1982 | Murphy | 364/521 |
|---|---|---|---|
| 4,495,600 | 1/1985 | Kikuchi et al. | 364/900 |
| 4,627,015 | 12/1986 | Stephens | 364/521 X |
| 4,646,259 | 2/1987 | Lincoln et al. | 340/799 X |
| 4,649,380 | 3/1987 | Penna | 340/728 X |
| 4,679,153 | 7/1987 | Robinson et al. | 364/523 |
| 4,694,405 | 9/1987 | Bradbury et al. | 364/518 |

Primary Examiner—Gary V. Harkcom
Assistant Examiner—H. R. Herndon
Attorney, Agent, or Firm—Fitzpatrick, Cella, Harper & Scinto

[57] ABSTRACT

A block processing apparatus includes a random access memory (RAM), a keyboard with breakpoint mark keys and a ruled line block key, a central processing unit (CPU), a character generator. The RAM includes a document memory for storing a character array, a block memory, a tab memory, a vertical ruled line table, a small block range table, a lateral ruled line No. memory area, an area for storing the number of large blocks, an area for storing the number of small blocks, a successive flag area, a character flag area, a carriage position memory and a cursor position memory. These memories in the RAM cooperates to convert marks entered at the keyboard to a plurality of types of ruled line patterns in accordance with the relative relationships between the characters and the marks. The resultant block document is stored in the block memory.

8 Claims, 12 Drawing Sheets

Fig. 4A  BSM | BSM(1) | BSM(2) | ••• | BSM(i) | ••••• |

Fig. 4B  BRM | BRM(1,1) | BRM(1,2) | •••••••••••• |
              | BRM(2,1) | BRM(2,2) | •••••••••••• |
              | •••••••••••••••••••••••••••• |
              | •••••••• | BRM(X,Y) | •••••• |
              | •••••••••••••••••••••••••••• |

Fig. 4C  TBM | TBM(1) | TBM(2) | ••• | TBM(i) | ••••• |

Fig. 4D  TKT | TKT(1,1) | TKT(1,2) | •••••••••••• |
              | TKT(2,1) | TKT(2,2) | •••••••••••• |
              | •••••••••••••••••••••••••••• |
              | •••••••• | TKT(p,q) | •••••• |
              | •••••••••••••••••••••••••••• |

Fig. 4E  SHT | SHT(1,1) | SHT(1,2) |
              | SHT(2,1) | SHT(2,2) |
              | •••••••••••• |
              | SHT(m,1) | SHT(m,2) |
              | •••••••••••• |

Fig. 5A

あいうえおかきABCDEアイウエオabcde123

Fig. 5B

●あいうえおかき◎ ◎ABCDE●アイウエオ◎abcde◎123●

Fig. 5C

```
    TAB  TAB TAB TAB
     ↓    ↓   ↓   ↓
    ┌─────┬───────┐
    │あいうえ│ ABCDE │
    │おかき │       │
    ├─────┼───┬───┤
    │アイウエ│a b│1 2│
    │オ   │c d│3  │
    │     │e  │   │
    └─────┴───┴───┘
```

Fig. 5D

```
    TAB  TAB TAB TAB
     ↓    ↓   ↓   ↓
    ┌─────┬───────┐
    │あいう│ A BCDE│
    │えおか│       │
    │き   │       │
    ├─────┼───┬───┤
    │アイウ│a b c│1 2│
    │エオ  │d e  │3  │
    └─────┴─────┴───┘
```

Fig. 11A

DOCUMENT MEMORY BSM(i)

●あいうえおかき◎◎ABCDE●アイウエオ◎abcde◎123●

Fig. 11B

TAB MEMORY TBM(j)

| 1 | 6 | 9 | 12 |  |  |  |
|---|---|---|----|---|---|---|

Fig. 11C

VERTICAL RULED LINE TABLE TKT(p,q)

| | | | | | | |
|---|---|---|---|---|---|---|
| FIRST LARGE BLOCK | 1 | 6 | 12 | | | |
| SECOND LARGE BLOCK | 1 | 6 | 9 | 12 | | |
| | | | | | | |

Fig. 11D

SMALL BLOCK RANGE TABLE SHT(m,n)

| | START POSITION | END POSITION |
|---|---|---|
| FIRST SMALL BLOCK | 2 | 5 |
| SECOND SMALL BLOCK | 7 | 11 |
| | | |

Fig. 11E

| BLOCK LINE NO. LNO | 1 |
|---|---|
| NUMBER OF LARGE BLOCKS DS | 2 |
| NUMBER OF SMALL BLOCKS SS | 2 |

BLOCK PROCESSING APPARATUS

BACKGROUND OF THE INVENTION

1. Field of the Invention

The present invention relates to a block processing apparatus for generating a block from a single serial character array.

2. Description of the Prior Art

In a conventional document composing apparatus with a one-line display, a document is paragraphed in a block format or is ruled, using the following techniques:

(A) The number of characters per line is determined, characters are entered while right and left blocks are formed within a line, and vertical blocks are entered in accordance with the right and left blocks. When two adjacent blocks are to be separated by a ruled line, a ruled line mark is entered between the characters or an underline is used.

(B) Block frames are created and controlled independently for the serial character array.

In conventional technique (A), when document editing (e.g., insertion, deletion or the like) is performed, the block is broken. Editing must be performed again in accordance with the block format. In technique (B), when editing (e.g., insertion, deletion or the like) is performed, block sizes become non-uniform. In some cases, characters extend outside their corresponding blocks, and blocking must be performed again.

The following techniques are used to compose a paragraphed block document from a one-line serial character string.

(A) Breakpoint marks are inserted at proper positions in a single serial character array to divide the array into portions, and a frame for divided portions representing vertical and lateral positions of the block is independently created in memory as absolute position data. The single serial character array and its frame are independently created.

(B) Breakpoint marks are inserted at proper positions in a single serial character array to divide the array into portions, and a frame for divided portions is given as m x n matrix data representing the number of vertical and lateral blocks. The matrix data is inserted together with line position data representing the boundaries of the lateral blocks at the beginning of the single character array.

In technique (A), when the document is edited (e.g., using insertion or deletion), document data differing from frame data is updated, and characters can be written over. In technique (B), m blocks are aligned along the vertical direction, and n blocks are aligned along the lateral direction. The position of the boundary between adjacent lateral blocks is given. The head lines of the respective blocks are set to start from the next line of the block immediately above. With this arrangement, even if the document is edited (e.g., using insertion or deletion), block framing can be easily performed. However, two adjacent lateral blocks cannot be combined to constitute a single block.

In a paragraphed block document using character data, the following conventional block width change techniques are used. One technique consists of changing the number of characters per line in each block. Another technique uses a specific function code for characters in each block to change the block width. However, these techniques require cumbersome and time-consuming operations and make the block format difficult to grasp.

There is a conventional column editing apparatus which divides a character array stored in a one-line memory and edits it into two vertical or lateral columns. However, when two vertical columns are further edited to obtain two lateral columns (i.e., a total of four columns) and vice versa, the number of characters in each block to be edited or the number of lines per block must be preset.

There are two types of conventional ruled line processing apparatuses: in the first, a ruled line pattern is directly entered; and in the second, a mark representing a ruled line pattern is inserted as a function between the characters, the ruled line pattern is generated, and the mark is converted to the ruled line pattern. In the latter apparatus;

(1) Only one type of mark is used, and each mark is converted to a corresponding ruled line pattern.

(2) One mark can represent a plurality of identical ruled line patterns.

With technique (1), only one type of mark is required, but the number of marks inserted in the document is equal to the number of ruled line patterns. In technique (2), only one mark is required for any number of identical ruled line patterns, but the number of different types of marks must be the same as the number of different ruled line patterns.

In conventional ruled line block processing apparatuses for dividing a single display document into sections to obtain a block document and drawing ruled lines between the blocks, two techniques are used. In the first, the ruled line frame and the document character array are separately controlled. In the second, the ruled line code itself is treated as a character in the document. When the length of the character array is changed by editing such as insertion or deletion, the ruled line position must be updated.

In conventional ruled line processing apparatuses for surrounding characters with ruled lines, the following techniques are used:

(A) Upper, lower, right and left ruled patterns for surrounding the characters are directly entered.

(B) Two points are specified to draw a straight ruled line.

(C) Two points forming a diagonal line are specified to draw ruled lines constituting a rectangle.

(D) Specific marks representing ruled line patterns are set continuously around the characters and are then converted to ruled line patterns.

With the above techniques, the operator must be able to predict the ruled line patterns. For example, when a single serial character array is edited into a block document which is then to be surrounded by ruled lines, it is easy to enter breakpoint marks but difficult to predict the ruled line patterns. As a results, ruled line pattern input is very difficult.

In a conventional apparatus for composing a document using a one-line display, when a document is blocked and the blocks are surrounded by ruled lines, either a ruled line is drawn at a boundary between the blocks, or ruled line codes are entered as characters while the document is being input. The techniques described above, however, are cumbersome and time-consuming. The document must be composed in consideration of the block format, so the operator cannot concentrate on document composition.

In conventional ruled line document processing apparatuses, the ruled line frame and the document character array are separately controlled. The ruled line codes are entered as characters in the document. For this reason, when the vertical ruled line positions are changed to create a new document format, the ruled line frame must be separately changed, and the character blocks are then fitted in the blocks of the new frame. Alternatively, the ruled line codes are relocated in other positions between adjacent characters to create a new document format, thus making the operation troublesome and time-consuming.

SUMMARY OF THE INVENTION

It is an object of the present invention to provide a block processing apparatus in which the above-mentioned conventional drawbacks are avoided, and in which two types of marks are used to divide a character document into vertical and lateral columns, and even if document format is broken by editing or a ruled line is drawn between the blocks, matching between the document and the blocks can be integrally established to prevent deviations in ruled lines.

It is another object of the present invention to provide a block processing apparatus in which the boundary between adjacent lateral or vertical blocks can be removed to obtain a large block when the serial character array is converted to a block document.

It is still another object of the present invention to provide a block processing apparatus in which two types of marks are used in a character array in a memory and have vertical and lateral column editing functions, respectively, and vertical/lateral column editing with a priority order for setting column order priority (vertical over lateral or vice versa) is provided.

It is still another object of the present invention to provide a block processing apparatus in which the boundary position of a block can be easily changed by tab setting or the like.

It is still another object of the present invention to provide a ruled line processing apparatus in which the position of a vertical ruled line can be easily reset by tab setting or the like to change document format.

It is still another object of the present invention to provide a ruled line block processing apparatus in which a mark has both a block division function and a ruled line function for drawing a ruled line at the boundary between the blocks when a single serial character array is converted into a ruled line block document.

It is still another object of the present invention to provide a ruled line processing apparatus in which a character array can be easily surrounded by ruled lines by sandwiching the first and last characters of the character array with marks.

It is still another object of the present invention to provide a ruled line processing apparatus in which a ruled line position always corresponds to the boundary of the blocks in accordance with the lengths of the block lines, even when a one-line display document is edited (e.g., using insertion or deletion) to create a block document.

It is still another object of the present invention to provide a ruled line processing apparatus in which a plurality of ruled line patterns of a plurality of types can be generated by a single mark in accordance with the relative position relationship between the characters.

BRIEF DESCRIPTION OF THE DRAWINGS

FIGS. 4A to 4E are diagrams showing the memory structure of the present invention;

FIGS. 5A to 5D are representations showing a serial character array and ruled line blocks;

FIGS. 11A to 11E and FIGS. 12A to 12E are diagrams showing various memory states during actual processing of the present invention.

DETAILED DESCRIPTION OF THE PREFERRED EMBODIMENTS

An embodiment of the present invention will be described with reference to the accompanying drawings.

Figure 1:
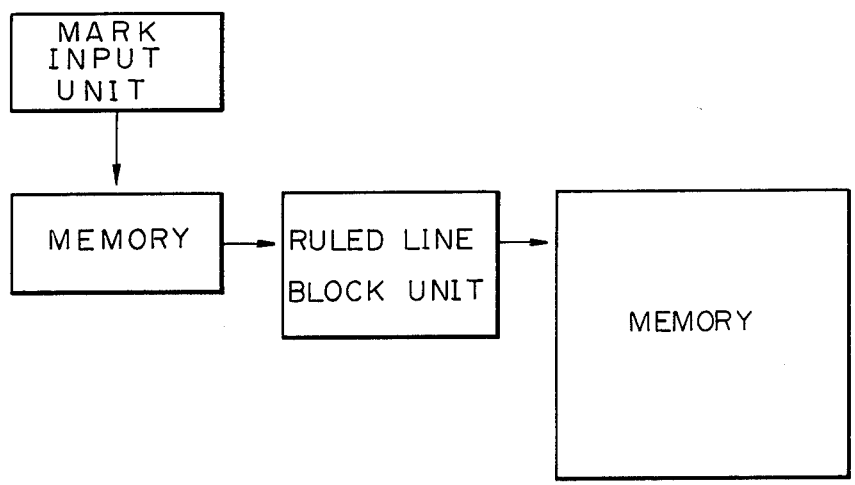
FIG. 1 is a block diagram showing the principle of the present invention.

The principle of the present invention is illustrated in FIG. 1. A serial character array is stored in a memory. Vertical and lateral division marks are entered in the serial character array. The character array in the memory is converted by a block forming means to a block document. More specifically, a character array shown in FIG. 5A is entered as a single serial character array. Marks ● and ⊙ are inserted at block division positions between adjacent characters, as shown in FIG. 5B. The mark ● represents vertical block division, and the mark ⊙ represents lateral block division for further dividing the vertically divided blocks. In order to indicate the boundary line positions of the blocks, tabs are set at four positions. When the operator depresses a ruled line block key, a ruled line block document shown in FIG. 5C is obtained. A character array surrounded by the marks ● is defined as a large block, and a character array surrounded by the marks ⊙ is defined as a small block. For printing, the large blocks defined by the marks ● are obtained by dividing the input character array, and each large block is further divided into small blocks defined by the marks ⊙.

The marks ● are set at three positions. The first mark ● indicates the start of the block and represents a lateral ruled line at the upper edge. The second mark ● indicates a lateral ruled line when the large block is further divided into small vertical blocks. The last mark ● indicates the end of the large block. Each mark ● represents a vertical ruled line corresponding to an outermost tab position.

The mark ⊙ indicates that the large block is further divided into small lateral blocks. Furthermore, the boundary line positions of the ruled line blocks correspond to tab positions excluding the outermost tab positions and are sequentially set as vertical ruled lines.

In FIG. 5B, two of the marks ⊙ are successively inserted between the characters "$" and "A". This indicates that the second block is to be omitted and combined and absorbed in the third block. As shown in FIG. 5C, no vertical ruled line is inserted at the third tab position, and the small block character array "ABCDE" is printed accordingly.

The print positions of the lateral ruled lines excluding the head line are next to the longest small block included in the large block surrounded by the marks ●.

As shown in FIG. 5D, when the second tab position is shifted one position to the left and is set, the first large block is enlarged by one line from two to three lines. The second lateral ruled line position is automatically moved downward. The second large block requires only two lines, so the last lateral ruled line is moved upward by one line.

An embodiment of the present invention will be described in detail with reference to the accompanying drawings.

Figure 2:
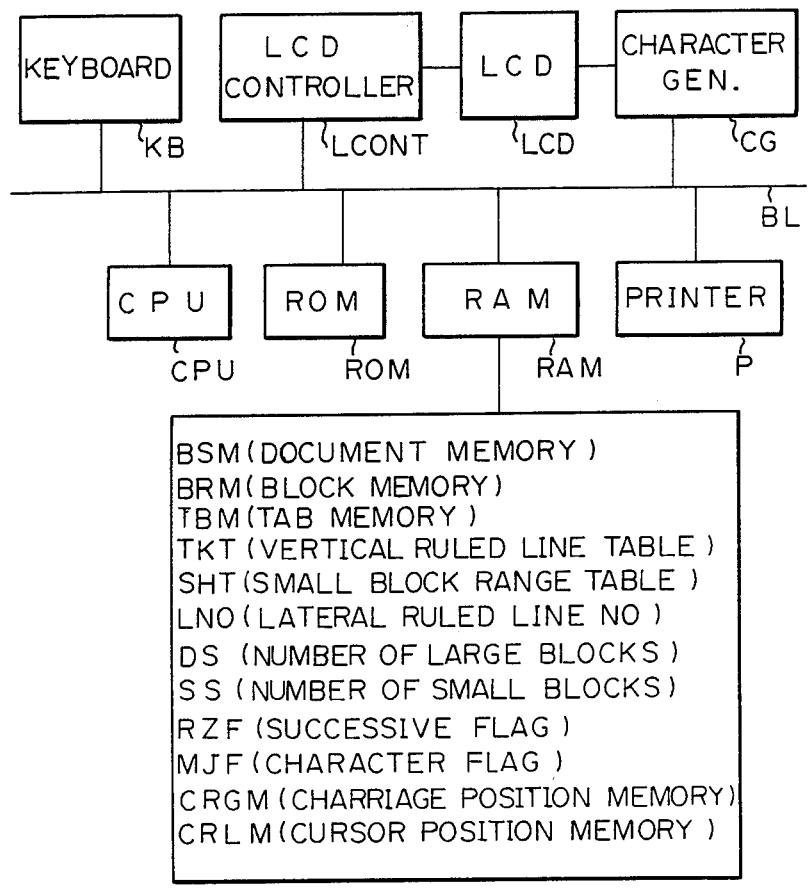
FIG. 2 is a block diagram showing a block processing apparatus according to an embodiment of the present invention.

FIG. 2 is a block diagram of a character processing apparatus according to an embodiment of the present invention. A CPU (Central Processing Unit) executes the contents of the program memory contained in a ROM (Read-Only Memory) and controls the respective components connected thereto via a bus line. The ROM is the program memory and stores the program whose steps are shown in the accompanying drawings.

A bus line BL is connected to the respective components of the character processing apparatus. A keyboard KB is connected to the bus line BL, and key-character data entered at the keyboard KB is supplied to and stored in a document memory BSM, which is part of a RAM (Random Access Memory), through the bus line BL. The keyboard KB has character keys CRK, a block identification key, a control key and the like. The memory RAM stores character data and displays it on a display LCD (Liquid Crystal Display). Fonts corresponding to the character codes are read out from a character generator CG controlled by an LCD controller LCONT and are supplied to and displayed on the display LCD through the bus line BL under the control of the CPU.

In addition to the document memory BSM, the memory RAM has: areas of a block memory BRM for forming blocks, a tab memory TBM for storing tab position data, a vertical ruled line table TKT representing vertical ruled line positions of each divided block, a small block range table SHT representing head and end positions of small blocks (to be described later), a number LNO of lateral ruled lines No., a number DS of large blocks, and a number SS of small blocks; RZF and MJF flags required for program execution; and temporary memory areas such as CRGM and CRLM for storing printer carriage position and cursor position. The printer is a device for printing the contents of the block memory under the control of the CPU.

Figure 3:
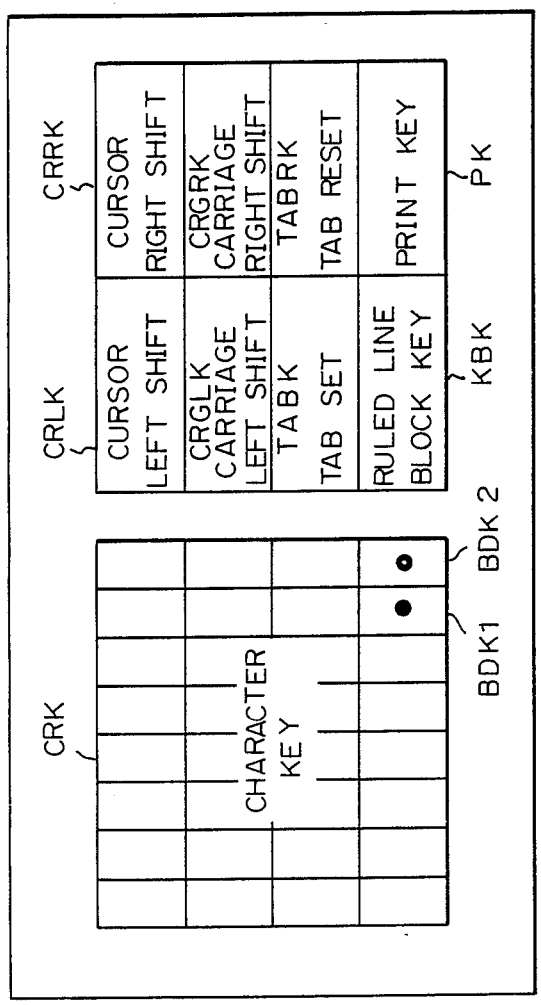
FIG. 3 is a plan view of a keyboard in the apparatus in FIG. 2.

FIG. 3 is an enlarged view of the keyboard KB in FIG. 2. The character keys CRK are used to enter characters. A character code corresponding to a depressed character key is stored in the document memory and displayed on the display LCD. The keyboard KB includes a keys BDK1 and BDK2 (to be described later) for entering marks ● and ⊙ for dividing (identifying) the blocks. Cursor left and right shift keys CRLK and CRRK shift the cursor representing the character position on the display to the left and right, respectively. Carriage left and right shift keys CRGLK and CRGRK shift the printer carriage to the left and right, respectively. A tab set key TABK sets a tab at a position corresponding to the carriage position. A tab reset key TABRK resets the tab. A ruled line block key KBK creates a ruled line block from a serial character array.

FIGS. 4A to 4E show formats of the document memory BSM, the block memory BRM, the tab memory TBM, the vertical ruled line table TKT and the small block range table SHT in the RAM.

The document memory BSM serially stores the character data from the start address to the end address. The serial character data is represented by BSM(i), (BSM(1), BSM(2), ...). The block memory BRM has a matrix structure in which data represented by BRM(x,y) (BRM(1,1), BRM(1,2), ...) is addressed from the head line. The tab memory TBM stores set tab position data in the order of addresses. The tab position data is represented by TBM(j) (TBM(1), TBM(2), ...). The vertical ruled line table TKT gives tab positions for each large block (to be described later), where the tab position data is represented by TKT(p,q) (TKT(1,1), TKT(1,2), ...). The small block range table SHT stores data consisting of the head and end lines and indicating which memory block area is a destination for each small block to be transferred thereto. The data in the small block range table SHT is represented by SHT(m,1), SHT(m,2) (SHT(1,1), SHT (1,2), SHT(2,1), ...). A printer P prints data read out from the RAM.

The operation of the embodiment described above according to the present invention will be described with reference to the flow charts in FIGS. 6 to 10 and the memory contents in FIGS. 11A and 11E and FIGS. 12A to 12E.

Figure 6:
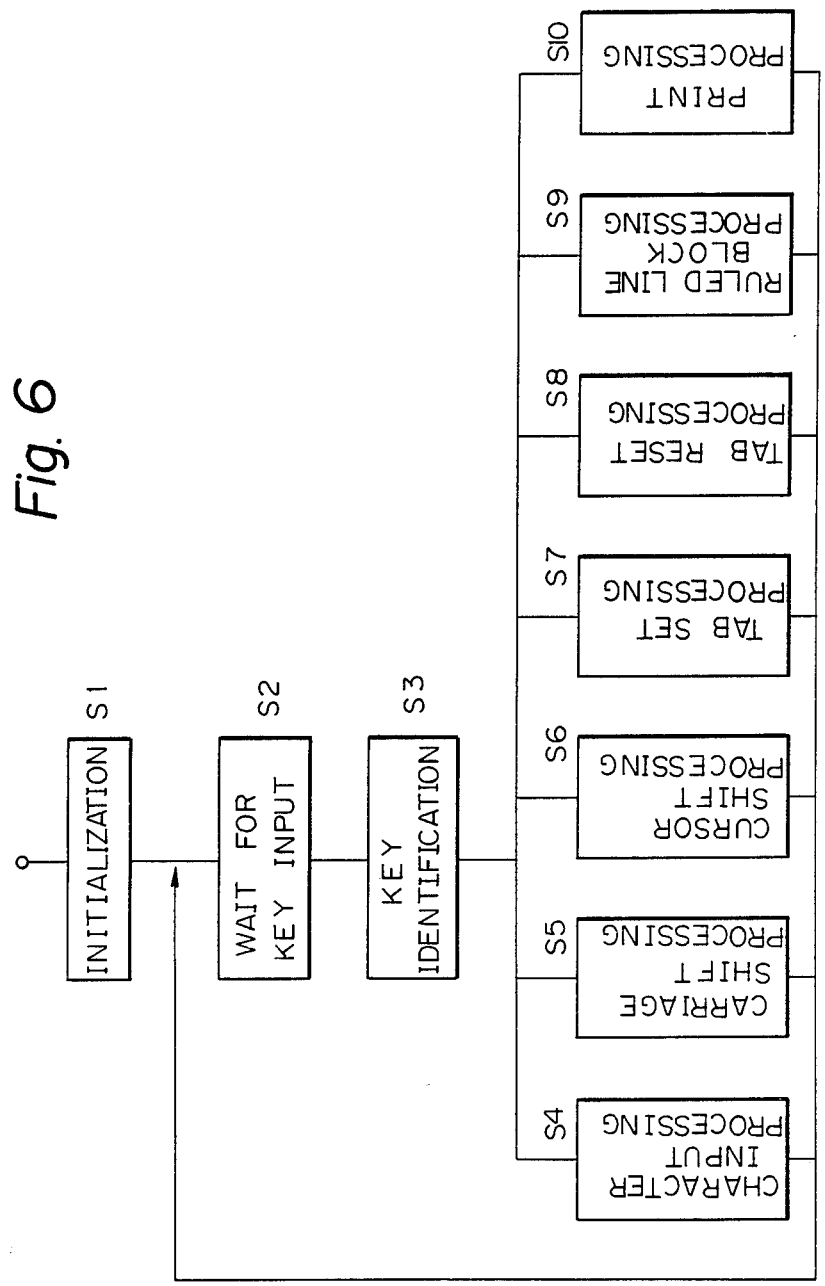
FIGS. 6 to 10 are flow charts for explaining the operation of the apparatus shown in FIG. 2.

When the power switch of the document processing apparatus is turned on, step s1 in FIG. 6 is executed. In set s1, the document memory BSM, the block memory BRM, the tab memory TBM and the vertical line table TKT in the RAM are cleared. The carriage is set in the home position. The cursor is set at the start address of the document memory BSM. The carriage position memory CRGM and the cursor position memory CRLM are initialized.

The flow then advances to step s2, and the CPU awaits key input at the keyboard KB in FIG. 3. When the operator depresses a key, the flow advances to step s3 to determine which key was depressed. The flow advances to one of steps s4 to s9 in accordance with the determination result in step s1.

Step s4 is executed when the operator depresses one of the character keys CRK. When one of the keys CRK is depressed, a corresponding character code is stored in an area of the document memory BSM which corresponds to the cursor position memory CRLM. The cursor position is then incremented by one, and at the same time the address of the cursor position memory CRLM is incremented by one.

Step s5 is executed when the operator depresses the carraige right or left shift key CRGRK or CRGLK. For example, if the operator depresses the carriage left shift key CRGLK, the printer carriage is shifted one character position to the left, and at the same time the content of the carriage position memory CRGM is decremented by one. However, if the operator depresses the carriage right shift key CRGRK, the printer carriage is shifted one character position to the right, and at the same time the content of the carriage position memory CRGM is incremented by one.

Step s6 is executed when the operator depresses the cursor right or left key CRRK or CRLK. For example, if the operator depresses the cursor left shift key CRLK, the address of the cursor position memory CRLM is decremented by one. However, if the operator depresses the cursor right shift key, the address of the cursor position memory CRLM is incremented by one.

Tab set processing is performed in step s7. The content of the carriage position memory CRGM is set in an empty area of the tab memory TBM in FIG. 4. The tab positions are stored in ascending order. The carriage position upon carriage shift is always stored in the carriage position memory CRGM, so that the tab is set at the actual carriage position.

Tab reset processing is performed in step s8. By referring to the content of the carriage position memory CRGM, if identical tab positions are present among the tab positions stored in the tab memory TBM in FIG. 4, the contents of the identical tab positions are cleared, and the lower address content is moved up one address. Therefore, the tab memory always stores carriage positions in ascending order.

In step s9, the content of the document memory BSM in FIG. 4 is used to create a ruled line block document while the content of the tab memory TBM is being retrieved, and the processed result is stored in the block memory BRM.

Print processing is performed in step s10.

Figure 7:
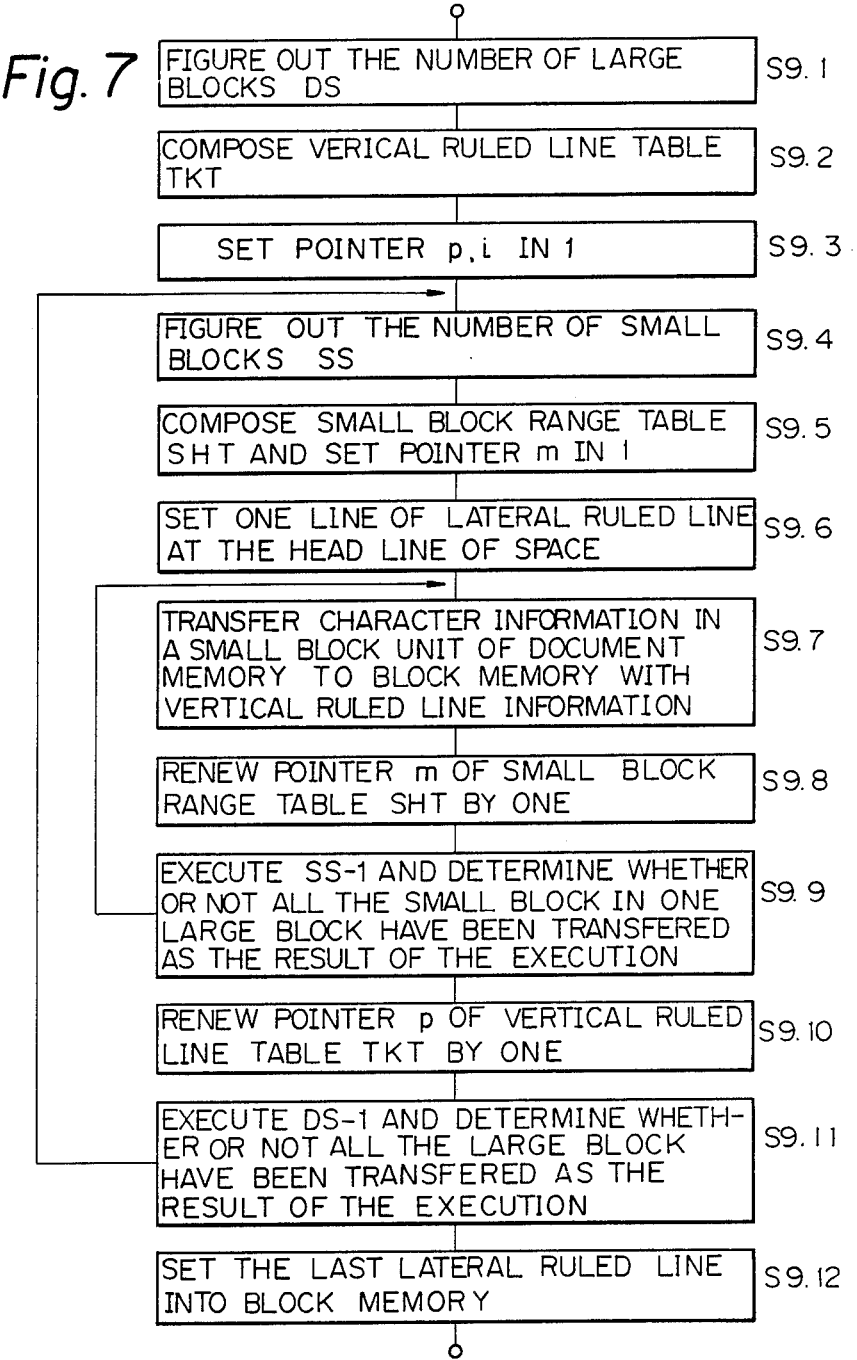
Figure 8:
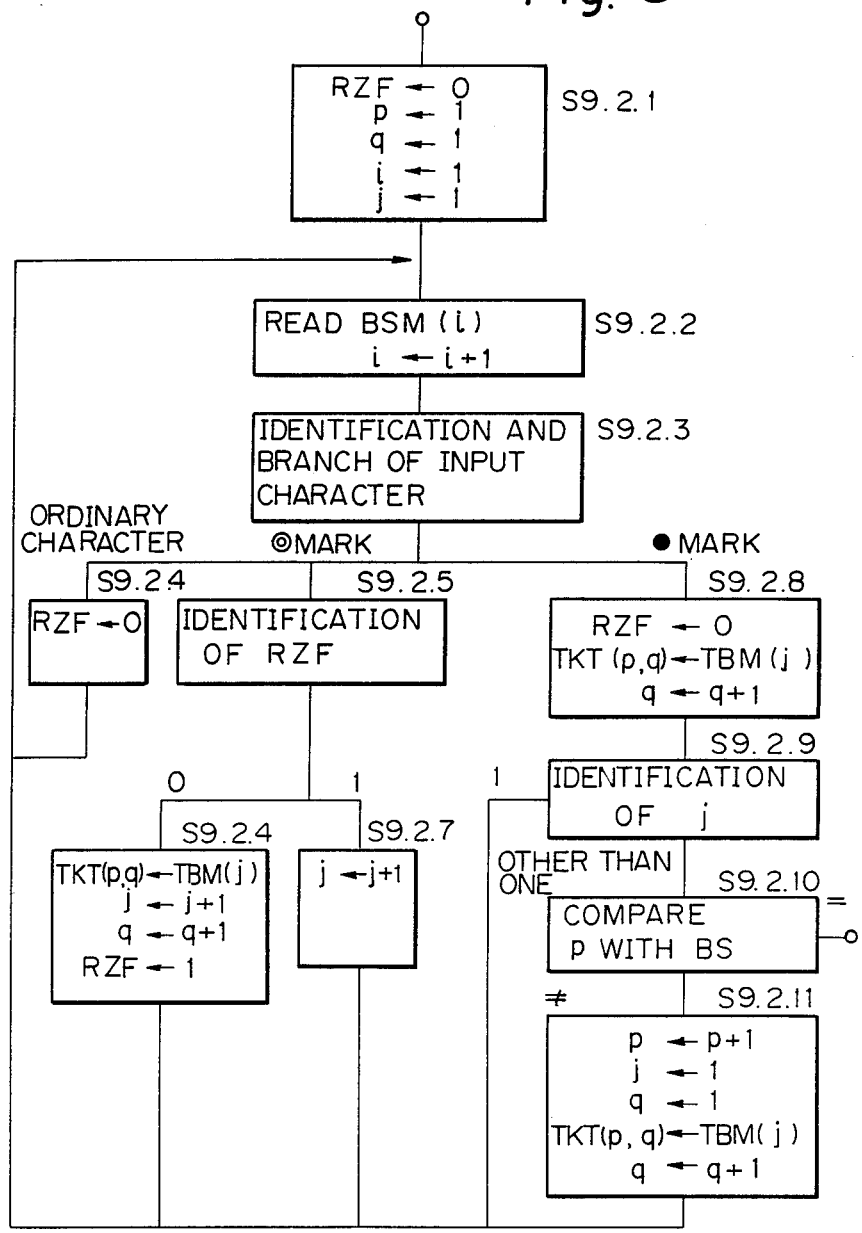

A detailed description of step s9 is made in FIG. 7. Referring to FIG. 7, in step s9.1, the number of large blocks is calculated in accordance with the number of marks ● in the document memory. The number of large blocks is set as the number DS in the RAM area.

In step s9.2, the positions of the vertical ruled lines for the large blocks are calculated to create the vertical ruled line table TKT. This processing will be described in detail with reference to FIG. 8.

In step s9.2.1, pointers and a flag are initialized. A flag RZF is used to check the continuous state of the marks ● and ⊙ and is initially set at logic "0". Pointers p and q show addresses in the vertical ruled line table TKT, and pointers i and j respectively show addresses in the document memory BSM and the tab memory TBM. These pointers are set at logic "1". The flow advances to step s9.2.2. The CPU fetches a character from the document memory BSM, and the pointer thereof is incremented by one. In step s9.2.3, the flow branches to one of three paths in accordance with the fetched character. When an ordinary character is fetched, the flow advances to step s9.2.4 and the flag RZF is cleared to zero. The flow returns to step s9.2.2 and the next character in the document memory BSM is fetched. When the mark ⊙ is fetched, the flow advances to step s9.2.5 and the state of flag RZF is determined. The flow branches again in accordance with the logic level (i.e., "0" or "1") of the flag RZF. If the flag RZF is set at logic "0", the mark ⊙ is located before an ordinary character or at the head of the document. In this case, the tab positions are valid, so the flow advances to step s9.2.6. The content of the tab memory TBM is transferred to the vertical ruled line table TKT. In the case of FIG. 11, the tab memory position for the mark ⊙ after the array " あいうえおかき " is represented by a 6. As shown in FIG. 11C, 6 is transferred to the first large block. When the transfer is completed, the pointer j of the tab memory TBM and the lateral pointer q of the vertical ruled line table TKT are incremented by one. The flag RZF is set at logic "1", and the flow returns to step s9.2.2.

Figure 9:
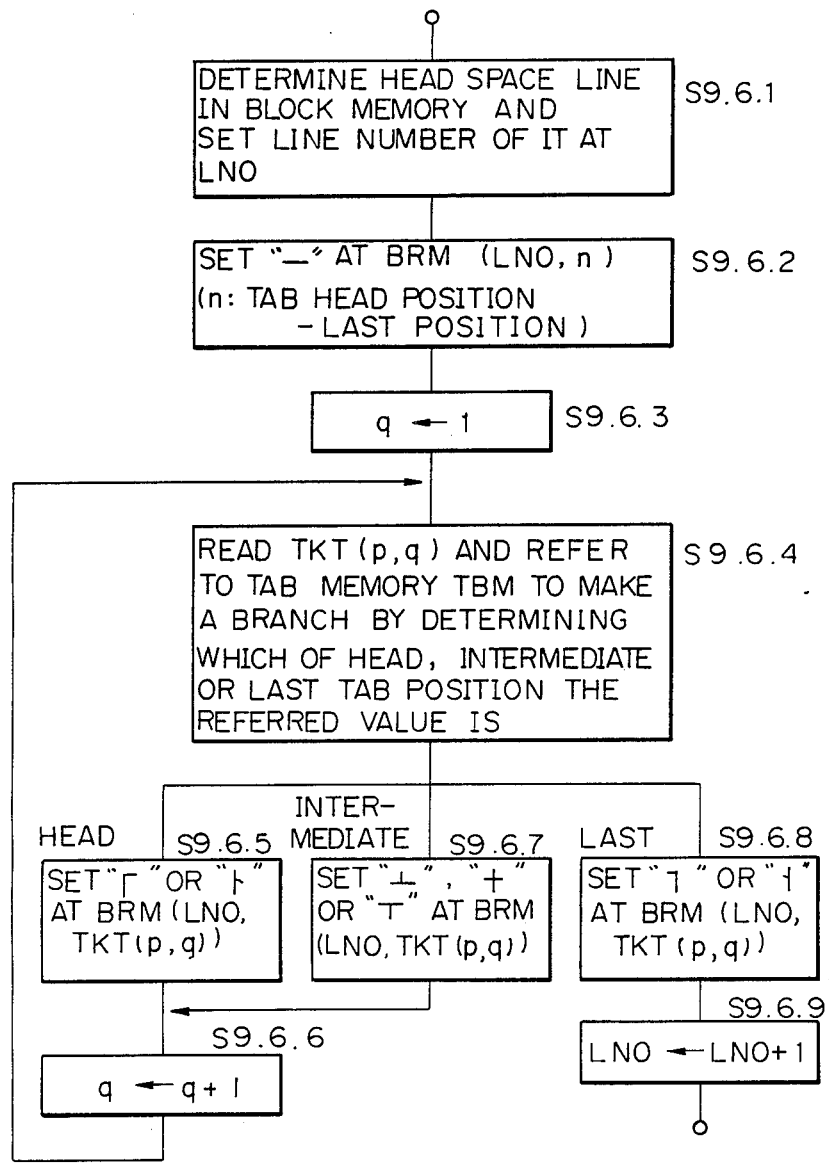

When the CPU determines in step s9.2.5 that the flag RZF is set at logic "1", the immediately preceding character indicates the mark ● or ⊙ and the flow advances to step s9.2.7. When the above marks are continuous, the vertical ruled line is omitted, and thus the pointer j of the tab memory TBM is incremented by one. The two marks ⊙ follow the character array " あいうえおかき ". In this case, the vertical ruled line corresponding to the second mark position is omitted. As shown in FIG. 11C, 9 is not included in the first block. Thereafter, the flow returns to step s9.2.2.

When the CPU determines in step s9.2.3 that the character in the document memory BSM is the mark ●, the flow advances to step s9.2.8. The flag RZF is set at logic "1", and the content of the tab memory TBM is transferred to the vertical ruled line table TKT. The lateral pointer of the vertical ruled line table TKT is incremented by one. The flow advances to step s9.2.9, and the pointer j of the tab memory TBM is checked. If j is 1, it indicates the head tab position, i.e., the head of the large block and the flow returns to step s9.2.2. However, if j is a value excluding 1, it indicates the last tab position, i.e., the end of the large block. The flow advances to step s9.2.10, and the vertical pointer p of the vertical ruled line table TKT is compared with the number DS of large blocks so as to determine whether or not the vertical ruled line tables for all the large blocks are created. When a comparison result p coincides with DS, this processing is ended and the flow returns to s9.3 in FIG. 7. However, when no coincidence is established in s9.2.10, the flow advances to step s9.2.11 and the vertical pointer p of the vertical ruled line table TKT is incremented by one. The next large block transfer is then prepared. The pointer j of the tab memory TBM and the lateral pointer q of the vertical ruled line table TKT are set to 1. The start content of the tab memory TBM is set in the head line of the vertical ruled line table TKT which corresponds to a new large block. The lateral pointer q of the vertical ruled line table TKT is incremented by one, and the flow returns to step 9.2.2.

The operations between steps s9.2.8 and s9.2.11 indicate that tab positions are set in a double vertical ruled line table TKT for causing one mark ● to set two vertical ruled lines at the end tab position of a given block and the head tab position of the next block. In this manner, the vertical ruled line table TKT shown in FIG. 11C is obtained.

Referring back to FIG. 7, in step s9.3, the lateral pointer p of the vertical ruled line table TKT and the pointer i of the document memory BSM are set at 1.

The flow advances to step s9.4, and the number of small blocks within one large block is determined. The calculated number is set as the number SS in the RAM area. In step s9.5, each small block range is calculated in accordance with the vertical ruled line table TKT. In the case of FIG. 11C, the first large block has three vertical ruled line positions (1, 6, 12), so that there are two small blocks therein. The small blocks fall within the ranges between 2 and 5 and between 7 to 11, respectively. This is summarized in a table in FIG. 11D.

In step s9.6, the one-line vertical ruled line data is set in the block memory, and at the same time, the value of the next line is set in the block line No. LNO. This operation will be described in detail with reference to FIG. 9.

In step s9.6.1, in FIG. 9, the content of the block memory BRM is checked to find a blank line. The blank line number is set in the block line No. LNO. The flow advances to step s9.6.2. The lateral ruled line marks "—" are set from the head to the end positions of the line corresponding to the block line No. LNO. These positions are stored in the tab memory TBM. Thereafter, in step s9.6.3, the lateral pointer q of the vertical ruled line table TKT is set to 1. In step s9.6.4, the content of the vertical ruled line table TKT is fetched by the CPU and is compared with each position stored in the tab memory TBM. The flow then branches in accordance with the head, intermediate or end position. When the CPU determines that the comparison result indicates the head position, the flow advances to step s9.6.5.

In step s9.6.5, the pattern "⌈" or "⊢" is set at a matrix position defined by the block line No. LNO and TKT (p.q.). The pattern "⌈" or "⊢" is selected by the value of the vertical pointer p of the vertical ruled line table TKT. If p is 1, no upper ruled lines are present and the pattern "⌈" is set. However, when the pointer p is a value excluding 1, the pattern "⊢" is set. Thereafter, the flow advances to step s9.6.6, and the lateral pointer q of the vertical ruled line table TKT is incremented by one. The flow returns to step s9.6.4 and the next tab position is fetched by the CPU.

In step s9.6.7, the pattern "⊥", "+" or "⊤" is set in the block memory BRM. A pattern is selected by the content of the immediately preceding block in the vertical ruled line table TKT. When the tab position in the previous large block is not present in the currently fetched large block, the pattern "⊥" is set. However, when the identical tab positions are present in the previous and current large blocks, the pattern "+" is set. When a tab position is not present in the previous large block but the current one, the pattern "⊤" is set. Thereafter, the flow advances to set s9.6.6.

Figures 12A, 12B, 12C, 12D, 12E:
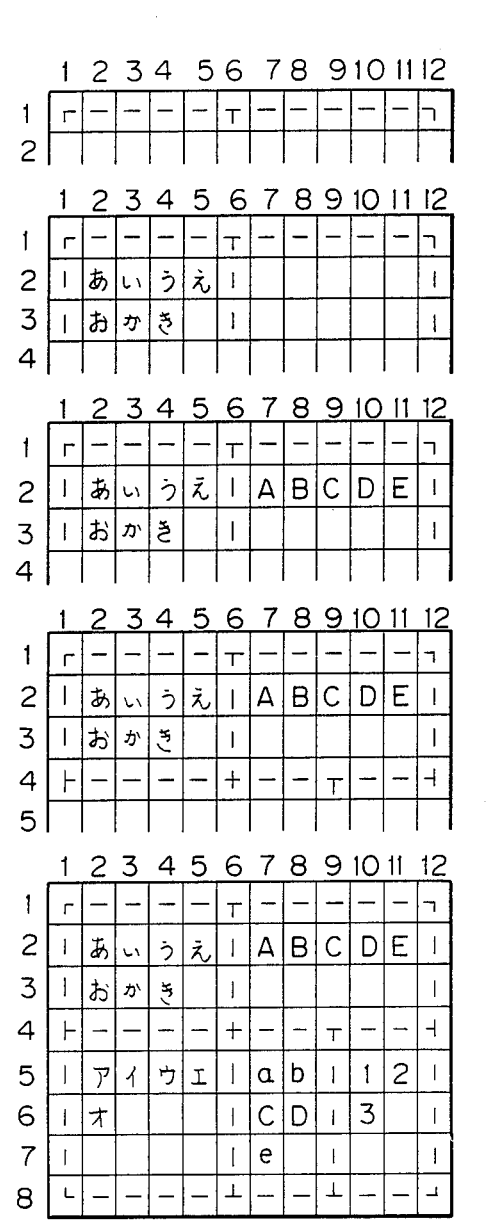

In step 9.6.8, the pattern "⌐" or "⊣" is set in the block memory BRM. A pattern is selected by checking whether or not the vertical pointer p of the vertical ruled table line TKT is 1. When this processing is completed, the flow advances to step s9.6.9. In order to change the line of the block memory, the block line number LNO is incremented by one. The first lateral line in FIG. 12A and the fourth lateral line in FIG. 12D are set in the block memory BRK. The flow then advances to step s9.7 in FIG. 7.

Figure 10:
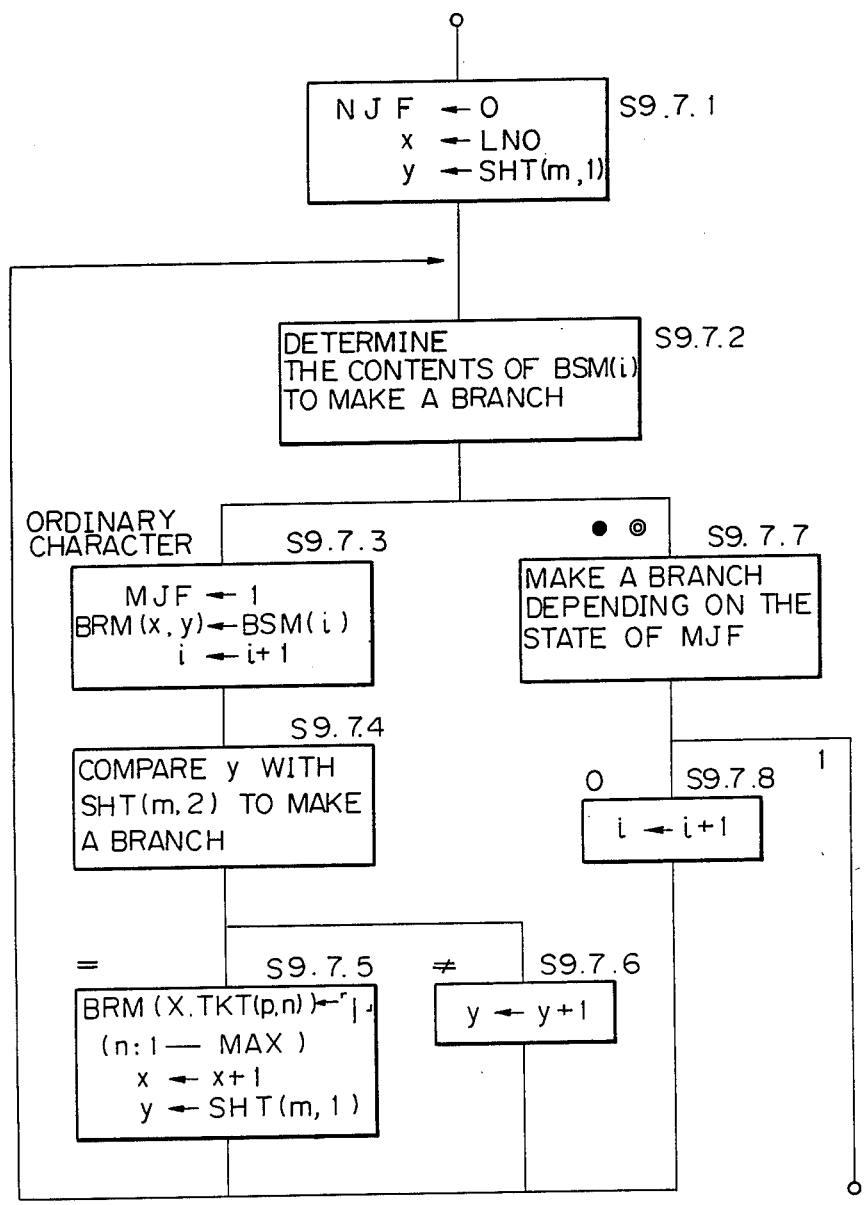

The character array included in the small block in the document memory is transferred together with the vertical rululed line data to the block memory BRK with reference to FIG. 10.

In step s9.7.1, a character flag MJF is cleared to logic "0". The flag MJF is set at logic "1" when even one ordinary character is entered. This flag is required to distinguish the start of the block from its end since the mark ● represents the start or end of the block. The value of the block line No. LNO is set in the lateral pointer x of the block memory BRM. The start position in the small block range table is set in the vertical pointer y. The flow advances to step s9.7.2, and the document memory is accessed. The flow branches in accordance with the content of the data read out from the document memory. When the CPU determines that the content of the document memory represents an ordinary character, the flow advances to step s9.7.3. The character flag MJF is set to 1, and the content of the document memory BSM is transferred to the block memory BRM. The pointer i of the document memory BSM is incremented by one. The flow advances to step s9.7.4, and the lateral pointer y of the block memory BRM is compared with the end position in the small range table SHT. This allows checking of whether or not one-line small block is completely transferred. When a coincidence is established in step s9.7.4, it means that one-line transfer is completed. In the case of FIG. 12B, the character array "あ い う え" of the second line is completely transferred. In this case, the flow advances to step s9.7.5, and a required number of vertical ruled lines is set for the transferred line. Thereafter, the vertical pointer x of the block memory BRM is incremented by one, and the lateral pointer y thereof is reset to the initial position SHT(m,1). When such processing is completed, the flow returns to step s9.7.2.

However, when the CPU determines in step s9.7.4 that one-line small block has not been completely transferred to the block memory BRM, the flow advances to step s9.7.6. The lateral pointer y of the block memory BRM is incremented by one, and the flow returns to step s9.7.2. The above operation is repeated, so that "あ い う え" and "ゕ ゙ ゔ ゙ ゚" can be transferred, as shown in FIG. 12B.

When the CPU determines or discriminates in step s9.7.2 that the content of the document memory BSM represents the mark ● or ⊙, the flow advances to step s9.7.7. The flow then branches in accordance with the value of the character flag MJF. When the character flag MJF is set at logic "0", it indicates the start of a large or small block. The pointer i of the document memory BSM is incremented by one. The flow returns to step s9.7.2 and the next character is fetched. However, when the CPU determines that the character flag MJF is set at logic "1", the character has already been transferred. The mark ● or ⊙ indicates the end of a large or small block. The processing is completed, and the flow advances to step s9.8 in FIG. 8.

In step s9.8, the pointer m of the small block range table SHT is incremented by one. In step s9.9, a calculation SS-1 is performed. The CPU determines whether or not all the small blocks in one large block are completely transferred to the block memory BRM. When the CPU determines that not all the small block are transferred to the block memory BRM, the flow returns to step s9.7. Otherwise, one large block "あ い う え ゕ ゙ ゔ ゙ ⊙ ⊙ ABCDE" of FIG. 11 is transferred, as shown in FIG. 12C. The flow advances to step s9.10.

In step s9.10, the pointer p in the vertical ruled line table TKT is incremented by one, and the next large block transfer is prepared.

In step s9.11, calculation of number DS-1 is performed to check whether or not the character data included in all the large blocks is completely transferred. If the number of large blocks which have been transferred is not zero, the flow returns to step s9.4, and the next large block is transferred. When a subtraction result is zero, the character data transfer of all the large blocks is complete and the flow advances to step s9.12.

In step s9.12, the ruled line at the end line of the block is transferred to the block memory.

The ruled line patterns "—" are set throughout the line in the same manner as in step s9.6. The ruled line patterns "⌊", "⊥" and "⌋" are selectively set in accordance with the contents of the vertical ruled line table TKT. When such processing is completed, all the required data is stored in the block memory BRM, thus obtaining the state shown in FIG. 12E.

When the operator depresses the print key PK after blocks are prepared as described above, the key is identified in step s10. As a result, the content of the block memory is printed at the printer.

The block document is printed at the printer in the above embodiment. However, the contents of the block memory can be displayed on a display.

What is claimed is

1. An information processing apparatus comprising:

memory means for storing a character information sequence;

format input means for inputting character arrangement format information in the character information sequence, said character arrangement format determining the character format arrangement of the character information sequence;

display means for displaying the character information sequence stored in said memory means in a first character arrangement format;

discrimination means, connected to said memory means, for discriminating the character arrangement format information in the character information sequence stored in said memory means; and print means for printing the character information sequence in the first character arrangement format and in a second character arrangement format different from the first character arrangement format in response to the discriminating by said discrimination means.

2. The information processing apparatus defined by claim 1, wherein said memory means is connected to said format input means and stores the character arrangement format information with the character information sequence.

3. The information processing apparatus defined by claim 2, further comprising character input means for inputting the character information sequence.

4. The information processing apparatus defined by claim 3, further comprising keyboard input means which includes said character input means and said format input means.

5. An information processing apparatus comprising:
memory means for storing a character information sequence;

format input means for inputting character arrangement format information in the character information sequence, said character arrangement format information determining the character format arrangement of the character information sequence;

display means for displaying the character information sequence stored in said memory means in a first character arrangement format;

discrimination means, connected to said memory means, for discriminating the character arrangement format information in the character information sequence stored in said memory means; and print means for printing the character information sequence in a second character arrangement format different from the first character arrangement format in response to the discriminating by said discrimination means.

6. The information processing apparatus defined by claim 5, further comprising character input means for inputting the character information sequence.

7. The information processing apparatus defined by claim 6, further comprising keyboard input means which includes said character input means and said format input means.

8. An information processing apparatus comprising:
memory means for storing a character information sequence;

format input means for inputting character arrangement format information which determines the arrangement of the character information sequence, said format input means inputting character arrangement format information in the character information sequence;

discrimination means, connected to said memory means, for discriminating the character arrangement format information in the character information sequence stored in said memory means; and print means for printing the character information sequence in a matrix array arrangement with ruled lines which represent the matrix in response to the discriminating by said discrimination means.

* * * * *

UNITED STATES PATENT AND TRADEMARK OFFICE
CERTIFICATE OF CORRECTION

PATENT NO. : 4,843,570

DATED : June 27, 1989

INVENTOR(S) : Kazunori Sugitani

It is certified that error appears in the above-identified patent and that said Letters Patent is hereby corrected as shown below:

On the title page

[73] AT ASSIGNEE
    Change "Cannon Kabushiki Kaisha" to --Canon Kabushiki Kaisha--.

FIGURE 2
    Change "CRGM(CHARRIAGE POSITION MEMORY)" to --CRGM (CARRIAGE POSITION MEMORY)--.

COLUMN 2
    Line 57, change "results" to --result,--.

COLUMN 6
    Line 39, change "step s1." to --step s3.---.
    Line 49, change "carraige" to --carriage--.

Signed and Sealed this

Ninth Day of October, 1990

Attest:

HARRY F. MANBECK, JR.

*Attesting Officer*      *Commissioner of Patents and Trademarks*